(12) United States Patent
Adams et al.

(10) Patent No.: US 9,803,803 B1
(45) Date of Patent: Oct. 31, 2017

(54) SYSTEM FOR COMPRESSED GAS ENERGY STORAGE

(71) Applicant: NORTHWEST NATURAL GAS COMPANY, Portland, OR (US)

(72) Inventors: Sarah Sue Adams, Portland, OR (US); Seyfettin Can Gulen, Middletown, MD (US); Roger Martin Haley, Portland, OR (US); David Alan Weber, Oregon City, OR (US); J. Keith White, Portland, OR (US)

(73) Assignee: Northwest Natural Gas Company, Portland, OR (US)

( * ) Notice: Subject to any disclaimer, the term of this patent is extended or adjusted under 35 U.S.C. 154(b) by 140 days.

(21) Appl. No.: 14/743,786

(22) Filed: Jun. 18, 2015

Related U.S. Application Data

(60) Provisional application No. 62/015,295, filed on Jun. 20, 2014.

(51) Int. Cl.
| | | |
|---|---|---|
| *F17C 5/06* | (2006.01) | |
| *F17C 7/00* | (2006.01) | |
| *F17C 13/00* | (2006.01) | |

(52) U.S. Cl.
CPC ............... *F17C 5/06* (2013.01); *F17C 7/00* (2013.01); *F17C 13/002* (2013.01)

(58) Field of Classification Search
CPC ............. F17C 13/002; F17C 5/06; F17C 7/00
USPC ........................................................ 141/82
See application file for complete search history.

(56) References Cited

U.S. PATENT DOCUMENTS

| | | | | | |
|---|---|---|---|---|---|
| 4,353,214 | A | * | 10/1982 | Gardner | F01K 3/00 60/39.52 |
| 4,403,477 | A | * | 9/1983 | Schwarzenbach | F02C 6/16 60/398 |
| 5,154,061 | A | * | 10/1992 | Weisshaar | B01D 5/0024 122/492 |
| 5,379,589 | A | * | 1/1995 | Cohn | F01B 17/00 60/39.59 |
| 5,537,822 | A | * | 7/1996 | Shnaid | F02C 6/04 60/650 |
| 5,934,063 | A | * | 8/1999 | Nakhamkin | F02C 6/06 60/727 |
| 7,104,071 | B2 | * | 9/2006 | Braun | F02C 7/141 60/39.26 |
| 7,739,874 | B2 | * | 6/2010 | Nigro | F01K 23/10 60/39.464 |

(Continued)

*Primary Examiner* — Timothy L Maust
*Assistant Examiner* — Andrew Schmid
(74) *Attorney, Agent, or Firm* — Marger Johnson

(57) ABSTRACT

Embodiments provide systems and methods for taking power from an electric power grid and converting it into higher-pressure natural gas for temporary storage. After temporary storage, the higher-pressure natural gas may be expanded through an expansion engine to drive a generator that converts energy from the expanding natural gas into electrical power, which may then be returned to the electric power grid. In this way, the disclosed systems and methods may provide ways to temporarily store, and then return stored power from the electric power grid. Preferably, the components of the system are co-located at the same natural gas storage facility. This allows natural gas storage, electrical energy storage, and electrical energy generation to take place at the same facility.

13 Claims, 4 Drawing Sheets

(56) References Cited

U.S. PATENT DOCUMENTS

| | | | | |
|---|---|---|---|---|
| 7,942,079 B2* | 5/2011 | Russ | ............... | F02C 7/32 |
| | | | | 60/39.15 |
| 2011/0148123 A1* | 6/2011 | De Doncker | ...... | B01D 53/1475 |
| | | | | 290/1 R |
| 2012/0003043 A1* | 1/2012 | Cawley | ............... | E21B 43/164 |
| | | | | 405/53 |
| 2012/0318403 A1* | 12/2012 | Cohen | ............... | F17C 7/02 |
| | | | | 141/3 |
| 2013/0341924 A1* | 12/2013 | Lewis | ............... | E21B 43/164 |
| | | | | 290/52 |
| 2014/0026584 A1 | 1/2014 | Naeve | | |

* cited by examiner

SYSTEM FOR COMPRESSED GAS ENERGY STORAGE

CROSS-REFERENCES TO RELATED APPLICATIONS

This patent application claims the benefit of provisional Application No. 62/015,295 filed Jun. 20, 2014, which is incorporated in this patent application by this reference.

FIELD OF THE INVENTION

This disclosure is directed to a system for energy storage, and, more particularly, for a system for energy storage using compressed natural gas in a reservoir as a storage medium.

BACKGROUND

There is a trend across states to mandate increasing amounts of energy to be derived from renewable resources. Electric utilities in California, for instance, are required to have 33% of their retail sales derived from eligible renewable energy resources by 2020, and this requirement may later increase to 50%.

The challenges of integrating major renewable energy resources, such as wind and solar energy, into the electric distribution grid are well known. These challenges include intermittency, low predictability, and a need for fossil-fuel powered backup generation, for example. Such challenges with renewable energy resources make it difficult to match electric power demand and supply, which is very important for both users and producers of electrical energy.

Storage systems for temporarily storing energy to be available to supply to the electrical grid are known. As examples, these may take the forms of pumped water storage, flywheel storage, chemical storage such as storage in batteries, as well as compressed air energy storage (CAES). Each system has its own requirements and inefficiencies. Pumped water storage must have access to large amounts of water and a suitable elevation change. CAES must have access to a storage facility, as well as the systems necessary for compressing and expanding the air efficiently.

Conventional CAES technology uses relatively cheap electric power during times of low demand to compress air into a reservoir where it is stored at high pressure. During times of high demand, when the price of electric power is relatively expensive, the stored air is expanded through a turbine with fuel that is ignited inside the turbine to generate power. The stored air may also be heated prior to entry into the gas turbine.

Also, conventional CAES is an open loop system in that the air used for compression is typically pulled from the atmosphere. Then, after expansion the air is vented back to the atmosphere. CAES has not proliferated in the United States due to its high initial cost for storage reservoir excavation and for its specialized expansion equipment. Also, CAES economics rely on the price spread between electricity prices at peak and low demand hours to make money.

Additionally, it has not been demonstrated that conventional CAES systems can safely use depleted natural gas reservoirs to store the compressed air. This can be extremely dangerous since the natural gas left in the reservoir, or that may still be seeping into the reservoir from natural sources, could form a flammable mixture.

Embodiments of the invention address shortcomings and other issues in the prior art.

SUMMARY OF THE DISCLOSURE

Embodiments of the disclosed subject matter are directed to energy storage systems that use natural gas as the storage medium.

Accordingly, at least some embodiments of a system at a natural gas storage facility include natural gas, a compressor, a controllable reservoir, an expansion engine, a heat exchanger at the expansion engine, an electric generator, and a system outlet. The natural gas is received from a natural gas pipeline system. The compressor is configured to receive varying quantities of natural gas and to compresses the natural gas from pipeline pressure to reservoir pressure, which is higher than the pipeline pressure. The reservoir is configured to receive the high-pressure natural gas from the compressor and temporarily store the natural gas for finite varying amounts of time. The reservoir is further configured to release the natural gas when needed for either electric power generation and or for returning, to the natural gas pipeline system, natural gas that was stored.

The expansion engine is configured to receive varying quantities of natural gas from the reservoir and to controllably expand the natural gas from the higher reservoir pressure to the lower pipeline pressure, while producing varying amounts of useful work or electric power. In this context, useful work or useful power means the total of the produced work or power, minus any inefficiencies or parasitic losses. In other words, the useful work or useful power are available to be used by other systems or components. The heat exchanger at the expansion engine is configured to heat the natural gas from the reservoir prior to expansion. The expansion engine and generator may be co-located at the natural gas storage facility with the compressor, the reservoir, and the heat exchanger at the expansion engine. Also, the generator is configured to be driven by the useful power produced by the expansion engine. The system outlet is configured to receive the natural gas from the expansion engine and to return the natural gas to the natural gas pipeline system.

The expansion engine could be a turbo-expander, reciprocating expander, or other device to controllably reduce the pressure, expand the volume of the gas and generate motion, typically rotational motion with the generator converting the rotational motion into electrical power. If configured appropriately, the system could be used for VARS support or as a synchronous condenser, if that is valuable and useful to the electric grid.

In other versions, at least some embodiments of a method of storing, at a natural gas storage facility, electrical power from a power grid and later returning stored electrical power to the power grid, may include receiving natural gas from a natural gas pipeline system at pipeline pressure; receiving electrical power from a power grid to power a compressor; compressing the natural gas from the pipeline pressure by the compressor to reservoir pressure to produce high-pressure natural gas; temporarily storing the high-pressure natural gas in an underground, depleted natural gas reservoir; removing a portion of the high-pressure natural gas from the reservoir; heating the removed natural gas with a heat exchanger; expanding the heated natural gas through an expansion engine from the reservoir pressure to the pipeline pressure to produce reduced-pressure natural gas; driving, with the expansion engine and concurrent with the expansion, a generator that is co-located at the natural gas storage facility with the reservoir, the expansion engine, and the heat exchanger; producing electrical power with the generator; transmitting the produced electrical power to the power grid; and returning the reduced-pressure natural gas to the natural gas pipeline system.

Accordingly, embodiments of the disclosed subject matter provide systems and methods for taking power from an electric power grid, and compressing the natural gas for temporary storage. After temporary storage, the compressed natural gas may be expanded to drive a generator that converts energy from the expanding natural gas back into electrical power, which may then be returned to the electric power grid. In this way, the disclosed systems and methods may provide ways to temporarily store, and then restore, power from the electric power grid.

Typically, the components of the system are co-located at the same natural gas storage facility. This allows natural gas storage, electrical energy storage, and electrical energy generation to take place at the same facility. Additionally, some embodiments allow essentially all of the natural gas that is taken from the natural gas pipeline system to be returned to the natural gas pipeline system. In such embodiments, no natural gas is deliberately outgassed or burned by the system.

Thus, the disclosed systems and methods may also facilitate integration of renewable energy sources into the power grid. That is, the systems and methods disclosed in this application may help to add or restore energy to the power grid when the renewable energy sources are intermittent or are not otherwise satisfying the demand of the power grid.

DETAILED DESCRIPTION

As described in this application, embodiments of the invention are directed to a system for storing energy using compressed natural gas in a reservoir as a storage medium, and then expanding the natural gas at varying flowrates to produce varying amounts of electrical power as needed at that point in time. Systems of this type are sometimes referred to in this application as a compressed gas energy storage (CGES) system.

Figure 1:
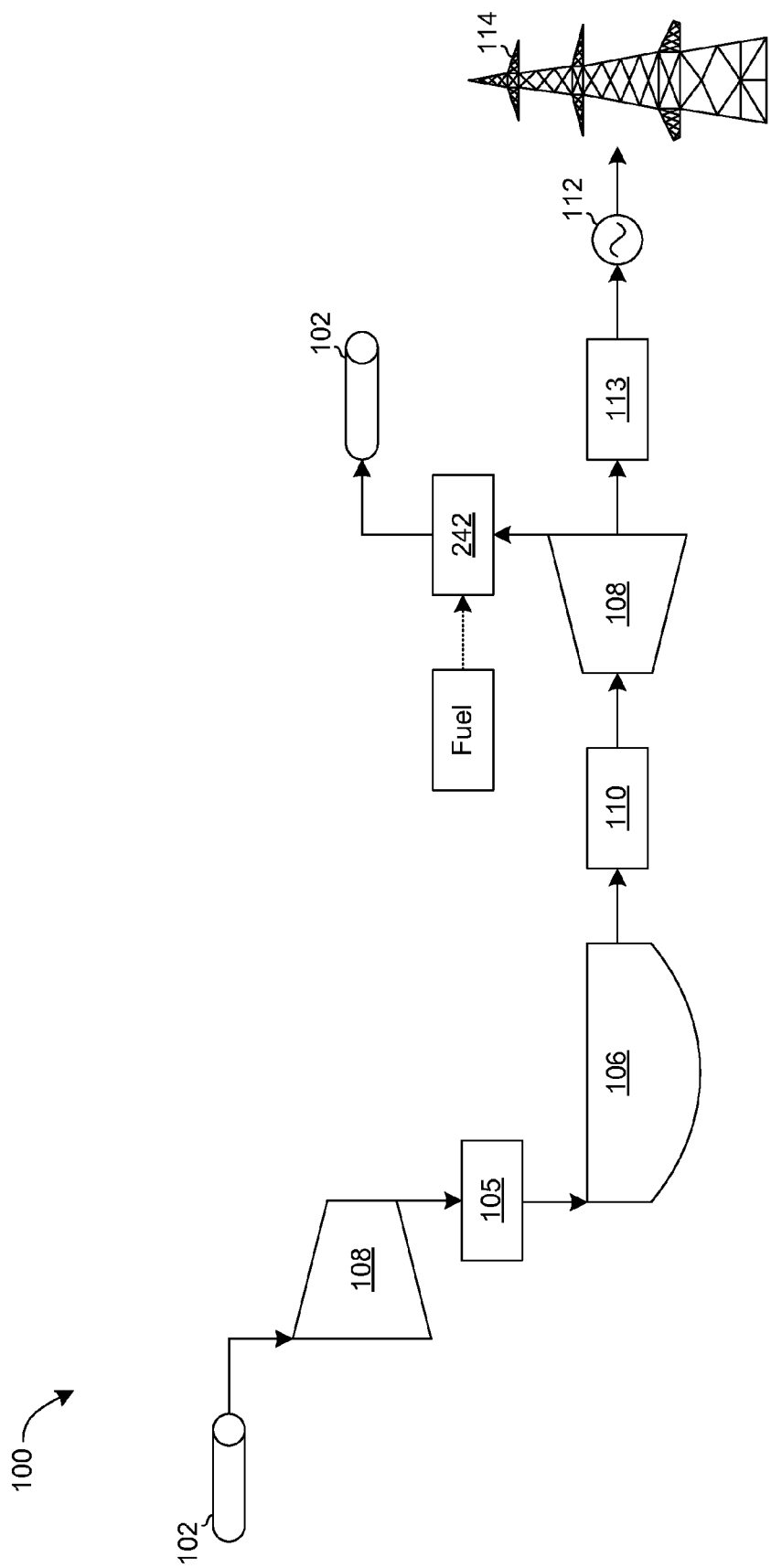
FIG. 1 is a block diagram of a system for compressed gas energy storage (CGES), according to embodiments of the invention.

FIG. 1 is a system 100 for compressed gas energy storage, according to embodiments. The system may include a natural gas pipeline system 102, a compressor 104, a heat exchanger 105, a reservoir 106, an expansion engine 108, and a heat exchanger 110 at the expander. In typical use, natural gas may be taken from the natural gas pipeline system 102 and sent to the compressor 104, where the natural gas is compressed. The heat of compression is either released to the atmosphere or stored for future use, and the natural gas is stored in the reservoir 106. Some or all of the natural gas can be removed from the reservoir 106 and sent to the expansion engine 108, where the pressure of the natural gas is reduced and rotational motion is created. The rotational motion may drive a generator 112 to produce electricity, which can be sent to an electric power grid 114, for example. Before entering the expansion engine 108, the natural gas may be heated by the heat exchanger 110 at the expander.

The generator 112 may be any generator configured to convert kinetic energy into electrical energy. The generator 112 may be an AC generator, such as symbolically shown in FIG. 1, or the generator 112 may be a DC generator. The generator 112, instead of or in addition to producing electrical energy, may also provide volt-ampere reactive (VAR) support. In electrical power systems, VAR support seeks to improve the VAR flow between the producer of the electrical power and the consumer of the electrical power by reducing electric line losses and increasing electrical grid efficiency. Additionally, the generator 112 may also act as a synchronous condenser to generate reactive power in the electric power grid.

The electric power grid 114 may be any building, municipal, local, regional, or wide area electrical grid supplying power to one or more power customers. Although embodiments are described in relation to the electric power grid 114, the principles discussed can be applied to other electric power systems of any scale. Preferably, electric power can be taken from and also returned to the electric power grid 114 or other electric power system by embodiments of the system for compressed gas energy storage.

The natural gas may have a composition as illustrated in Table 1, or any other pipeline-quality natural gas composition.

TABLE 1

| Example Natural Gas Composition | |
|---|---|
| $CH_4$ | 95.40% |
| $C_2H_6$ | 1.80% |
| $C_3H_8$ | 0.14% |
| $n-C_4H_{10}$ | 0.02% |
| $n-C_5H_{12}$ | 0.00% |
| $n-C_6H_{14}$ | 0.00% |
| $n-C_7H_{16}$ | 0.00% |
| $N_2$ | 0.00% |
| $CO_2$ | 2.50% |
| $H_2O$ | 0.14% |

As used in this application, "natural gas pipeline system" means one or more pipelines or a network of pipelines to transport natural gas. The pipeline may be any conventional pipeline configured to transport natural gas over short or long distances. For example, the pipeline may be constructed from carbon steel pipe or other material having a diameter of between about two inches and about sixty inches. Preferably, the natural gas in the natural gas pipeline system 102 is pressurized to between about 30 psia and about 1,600 psia. More preferably, the natural gas in the natural gas pipeline system 102 is pressurized to less than about 900 psia. The natural gas may be drawn from and returned to the same pipeline, or it may be returned to a different pipeline or pipelines.

The compressor 104 compresses the natural gas from a pipeline pressure to a reservoir, or storage, pressure. For example, the compressor 104 may compress the natural gas from a pipeline pressure of about 600 psia to a reservoir pressure of about 2,500 psia. Thus, natural gas leaving the compressor 104 is said to be at high or higher pressure because the storage pressure is greater than the pipeline pressure.

While a conventional compressor may be used, many conventional compressors are natural gas fueled and require natural gas from the natural gas pipeline system 102 to be burned as fuel gas. To facilitate using excess electric power, such as from renewable sources, the compressor 104 is an electric-drive compressor that uses electricity supplied by the electric power grid 114 to power the compressor 104. More preferably, the compressor 104 is a multi-stage electric-drive compressor, having two or more compressor stages. In this way, power taken from the electric power grid 114 may be more efficiently utilized for compressing gas for storage. An example compressor 104 may include design specifications such as those shown in Table 2.

TABLE 2

Example Design Specifications for Compressor

| | |
|---|---|
| Gas flow: | 64 MMSCFD |
| Suction: | 543 psia, 80° F. |
| First stage discharge: | 1,253 psia |
| Inter-cooler discharge: | 120° F. |
| Second stage discharge: | 3,220 psia |
| After-cooler discharge: | 120° F. |
| First stage BHP: | 3,008 (2,243 kW) |
| Second stage BHP: | 3,806 (2,838 kW) |

The reservoir 106 may be any vessel, geological formation, or chamber configured to store natural gas. Examples of conventional reservoirs that may be used are storage tanks, depleted gas reservoirs, water aquifers, and salt caverns. A depleted gas reservoir is an underground reservoir that once held natural gas for millions of years, and human beings have produced most of the gas out of it. That is, natural gas once collected there without human intervention, but much of the accumulated natural gas has been removed for consumption by human beings, leaving behind a substantially empty, or depleted, reservoir. The flow of natural gas into and out of the reservoir 106 is controllable.

The reservoir 106 may be above ground or below ground. Preferably, the reservoir 106 is a depleted gas reservoir located underground. More preferably, the reservoir 106 is deep underground, at a depth of one thousand feet or more. Even more preferably, the reservoir 106 is at least five thousand feet underground. Natural gas in the reservoir 106 is typically stored at relatively high pressures, such as between around 1,500 psia and around 4,000 psia. For example, the natural gas may be stored at around 3,000 psia at 100° F.

Preferably, the reservoir 106 is configured to hold a relatively large volume of natural gas. More preferably, the total storage capacity of the reservoir 106 is at least two billion cubic feet. For example, the reservoir 106 may have a total storage capacity of about twenty billion cubic feet of natural gas, or more.

A reservoir 106 having a relatively large capacity may provide several advantages. For example, the majority of the compressed natural gas can be stored for weeks or months, while a portion is still available for daily power generation, if needed. This is because the volume of natural gas needed to provide for daily power generation is typically minuscule compared to the total capacity of a large reservoir. For example, the daily requirement may be less than one percent of the total capacity of the reservoir 106. By contrast, a conventional compressed air system utilizes a relatively small reservoir and cannot provide both day-to-day power generation and long-term storage on the order of weeks or months.

The expansion engine 108 may be any type of device that reduces the pressure of the gas while creating motion, which may include rotational motion. The expansion engine 108 allows the natural gas to move from the reservoir pressure back to the pipeline pressure in a controlled manner while producing useful work. Thus, for example, the pressure of the natural gas may drop from about 3,000 psia to about 900 psia through the expansion engine 108. The expansion engine 108 may drive the generator 112 to convert energy from the expanding natural gas into electrical power.

Preferably, the expansion engine 108 has multiple stages, and is connected via a gearbox 113 to the generator 112. The gearbox 113 may change the rotational speed of the expansion engine 108. For example the gearbox 113 may step up or step down the rotational speed of the expansion engine 108 to a desired rotational speed of the generator 112. For example, the expansion engine 108 might operate at approximately 5,000 to 20,000 rpm, while the generator 112 might operate at approximately 600 to 3,600 rpm. The expansion engine 108 may be a two-stage turbo-expander connected to the generator 112 via the gearbox 113.

The power output of the turbo-expander is primarily controlled by gas flow rate, pressure ratio, and inlet temperature. Thus, for a given gas composition, a higher flow rate of natural gas through the turbo-expander, a higher pressure ratio across the turbo-expander, and a higher temperature of natural gas coming into the turbo-expander may each lead to increased power output of the turbo-expander.

An example of a turbo-expander includes the features in Table 3:

Table 3—Example of Turbo-Expander Features 13.8 kV, 60 Hz synchronous generator with integral gearbox, having a shaft-to-electric output efficiency of about 94.5%

Stage 1: 13,310 rpm, 1.79 pressure ratio, 15,361 hp shaft output, with 85% isentropic efficiency Stage 2: 9,940 rpm, 1.89 pressure ratio, 16,685 hp shaft output, with 85% isentropic efficiency The heat exchanger 110 at the expander may heat the natural gas before it enters the expansion engine 108. In embodiments, the heat exchanger 110 at the expander may include one or more heat exchangers. The primary reasons for heating the gas are to increase power production and to prevent the formation of liquids or solids within the expansion engine 108. If the expansion from the reservoir pressure and temperature, for example, about 3,000 psia at approximately 100° F., to the pipeline pressure, for example, around 900 psia, were done without any preheating, the temperature of the gas at the end of the expansion could drop to approximately −18° F. This is not desirable because hydrocarbon liquids, ice, and methane-hydrates may form in the reduced pressure gas. But heating the gas prior to expansion helps to prevent liquids and solids formation, thereby avoiding excessive wear and tear on components of the system, especially turbo expander blades. Also, preheating the gas upstream of each expansion stage results in increased power output, as noted above.

Figure 2:
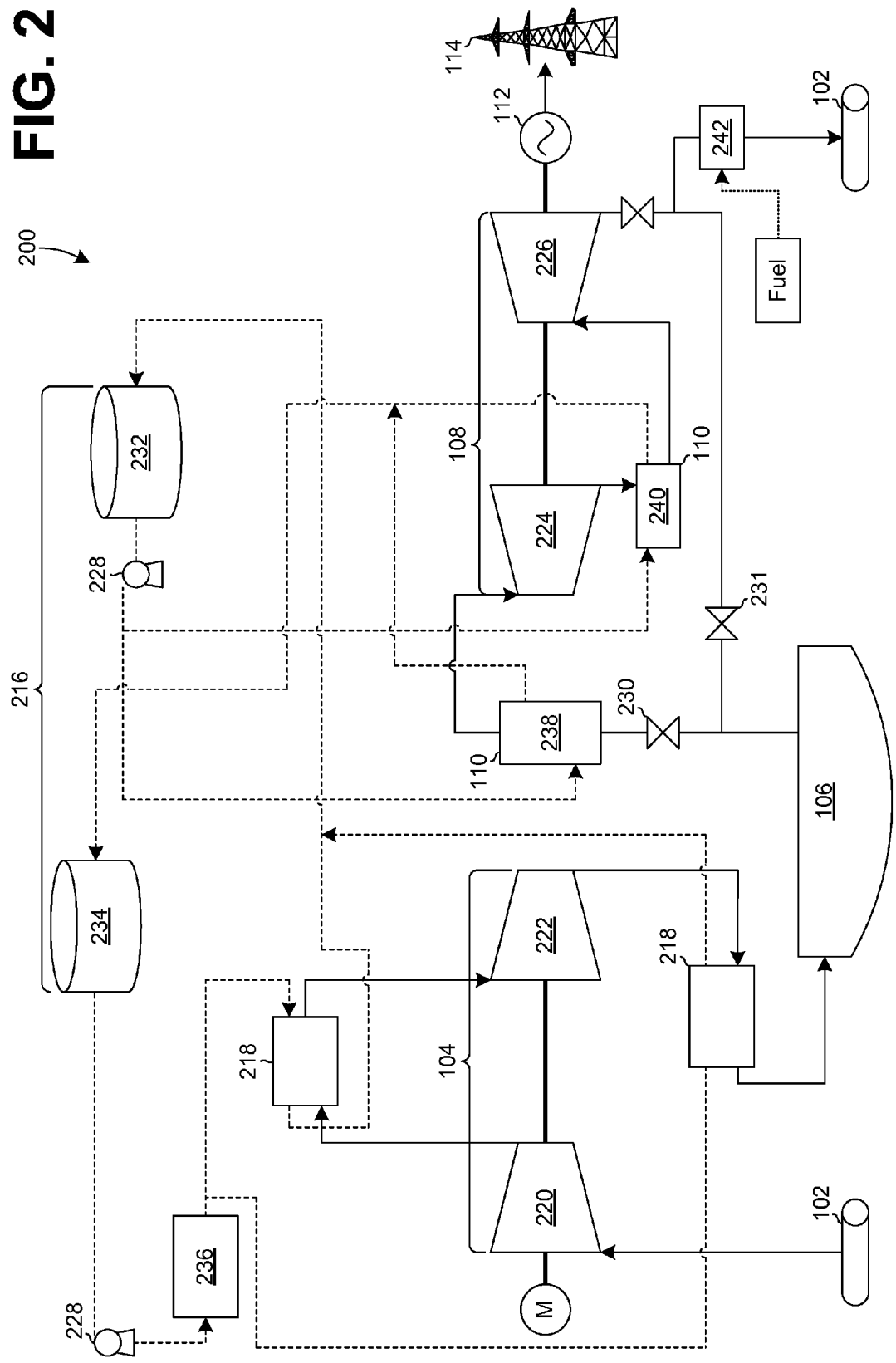
FIG. 2 is a block diagram of a system for CGES having an adiabatic setup, according to embodiments.

FIG. 2 is a system 200 for compressed gas energy storage having an adiabatic setup, according to embodiments. The system may include a natural gas pipeline system 102, a compressor 104, a heat exchanger 218 at the compressor, a reservoir 106, an expansion engine 108, a heat exchanger 110 at the expansion engine, and a thermal storage system 216. As noted above, the compressor 104 may be a multi-stage compressor having a first stage 220, a second stage 222, and possibly subsequent stages. And there may be more than one physical compressor acting in either series or parallel mode, with each such physical compressor being either single- or multi-staged. Also, the expansion engine 108 may be a multi-stage expansion engine having a first stage 224, a second stage 226, and possibly subsequent stages. There may be more than one expander in parallel, and each expander may be single- or multi-staged.

Various pumps 228 and valves 230, 231 may also be located within the system, such as shown in the figure. As shown, the valve 231 could represent a system of line heaters, actuated valves, control valves, or regulators that are standard storage system components that would allow natural gas, in excess of what the expansion engine process equipment could process, to be delivered to the natural gas pipeline system. The need for this type of operation or capability may occur depending on the overall storage field capabilities, customer needs, profitability, and the maximum flowrate design for the expansion engine process. Other valves, shown or not, are typically used to control the direction of flow or to control the quantity or proportionality of flow going to or coming from various locations within the process. The pumps 228 shown in the system are typically used to move thermal transfer fluid around the process.

Natural gas flows through the system 200 as described above for FIG. 1, except that the energy for the heat exchanger 110 at the expander may come from the heat exchanger 218 at the compressor and the thermal storage system 216 as described below. The natural gas pathways through the system 200 are shown in solid lines, and the pathways of the thermal transfer fluid are shown with dashed lines.

Because its primary function is to compress the natural gas, the heat energy generated by the compression process is normally waste heat that is released into the environment, such as through fin-fan inter-coolers and after-coolers. In embodiments, the heat exchanger 218 at the compressor receives higher temperature natural gas that has gotten hot due to the heat of compression. For example, the heat exchanger 218 at the compressor may include one or more shell-and-tube heat exchangers. In embodiments having a multi-stage compressor 104, a shell-and-tube heat exchanger may be between each of the stages, and another shell-and-tube heat exchanger may be after the final stage. The heat exchanger between the stages is generally known as an inter-cooler, and the heat exchanger after the stages is generally known as an after-cooler.

In some embodiments, the heat energy taken by the heat exchanger 218 at the compressor is first transferred to the thermal storage system 216 before being transferred to the heat exchanger 110 at the expander. For example, since compression of the natural gas by the compressor 104 and expansion of the natural gas by the expansion engine 108 take place at different points in time, the energy from the compressor 104 may be stored in the thermal storage system 216 for use during the expansion. In either case, the heat energy may be transferred through a thermal storage medium, some examples of which are described below for the thermal storage system 216, although there are many other ways of storing heat.

The thermal storage system 216 may include a hot tank 232, a cold tank 234, and the thermal storage medium. The thermal storage medium acquires the heat energy from the heat exchanger 218 at the compressor and heated thermal transfer fluid is sent to the hot tank 232 for temporary storage of the heat. When needed, such as during expansion of the natural gas, the heated thermal transfer fluid is sent to the heat exchanger 110 at the expander. There, the thermal transfer fluid transfers a large portion of its heat energy to the natural gas prior to expansion via the heat exchanger 110 at the expander. The thermal transfer fluid, which is now cooled, is then sent to the cold tank 234 for temporary storage. The cycle is completed when the cooled thermal transfer fluid is sent from the cold tank 234 back to the heat exchanger 218 at the compressor.

The thermal storage medium is any medium capable of absorbing heat energy, holding all or most of the heat energy for a period of time, and then transferring the heat energy back to the natural gas, possibly via a thermal transfer fluid. The thermal storage medium may be the same as the thermal transfer fluid, or it may be different. For example, the heat transfer medium may be a large immobile solid mass, in which case the heat transfer piping will be different than described, but the storage and movement of the heat will still occur.

Typically, there are three options for the thermal transfer fluid: molten salt, a commercial heat transfer fluid, or water, where water includes solutions where water is a primary component, such as water-glycol solutions. The molten salt may be a mixture of near-eutectic-point sodium nitrate (NaNO3) and potassium nitrate (KNO3) in a 60:40 ratio by percent weight. An example of a commercial heat transfer fluid is the Therminol® heat transfer fluid provided by Eastman Chemical Company. Under some conditions, the natural gas temperatures during compression and expansion, which may be between around 100° F. and about 300° F., may preclude the use of molten salt due to its high freezing point of about 428° F. That same temperature range makes water at relatively low pressures, such as between about 10 psia and 150 psia, a suitable storage medium in relation to heat transfer fluid. Accordingly, water is generally the preferred thermal transfer fluid.

Some embodiments may include a heat exchanger 236 between the cold tank 234 and the heat exchanger 218 at the compressor to cool the heat transfer fluid so that, for example, the discharge temperature of the natural gas is low enough for the rest of the process equipment or other reasons. For example, the temperature of water, as the thermal storage medium, in the cold tank 234 may be hotter than the desired temperature at the heat exchanger 218 at the compressor. Thus, the water may be cooled by the heat exchanger 236 as the water is sent from the cold tank 234 to the heat exchanger 218 at the compressor. In embodiments, the heat exchanger 236 may be a mechanical-draft wet cooling tower or a fin-fan heat exchanger.

In embodiments where the expansion engine 108 has multiple stages, such as shown in FIG. 2, the heat exchanger 110 at the expander may include a preheater 238 before the first stage 224 and a reheater 240 before the second stage 226 and any subsequent stages. In this way, the natural gas may be heated before each stage of the expansion engine 108, maximizing power production and minimizing the potential for the formation of liquids or solids. In such embodiments, the heated thermal transfer fluid may be sent from the hot tank 232 to the preheater 238 and the reheater 240 of the heat exchanger 110 at the expander.

In some embodiments, the system also includes a dehydration unit 242. The dehydration unit 242 is configured to remove moisture from the natural gas before it returns to the natural gas pipeline system 102. Typically, the dehydration unit 242 is a triethylene glycol (TEG) dehydration unit. The natural gas is usually dehydrated sufficiently to bring the gas back into pipeline-quality specifications, which is typically less than seven pounds of water per million standard cubic feet of natural gas.

Thus, the system of FIG. 2 may be considered adiabatic because, in embodiments, the heat of compression is captured from and returned to the natural gas with very little heat loss.

Figure 3:
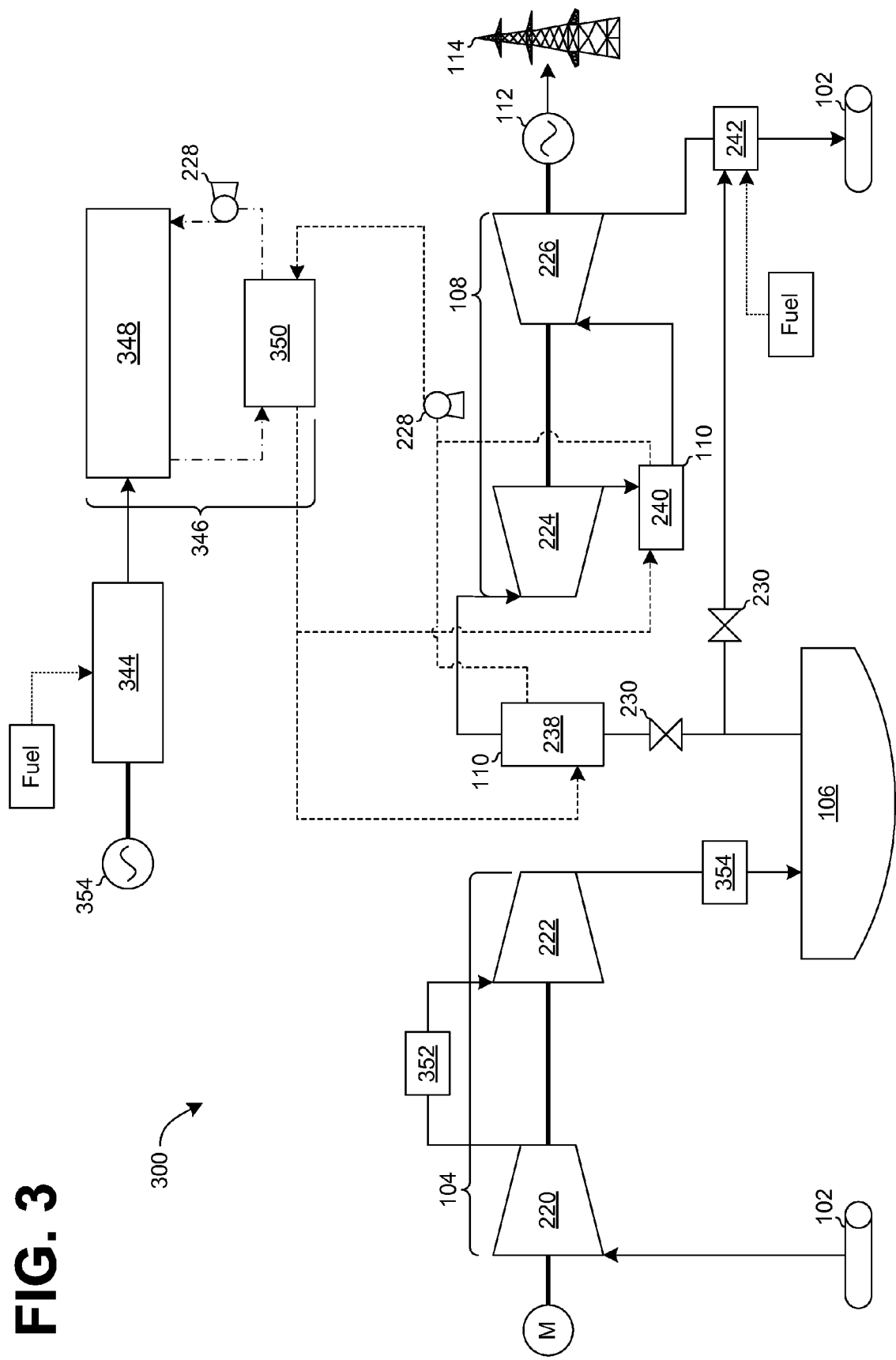
FIG. 3 is a block diagram of a system for CGES having a prime mover as a heat source, according to embodiments.

FIG. 3 is a system 300 for compressed gas energy storage having a prime mover 344 as a heat source instead of capturing the waste heat of compression as in FIG. 2, however it is possible to have both the systems for both FIG. 2 and FIG. 3 co-located, according to embodiments. The system may include a natural gas pipeline system 102 or systems, an electric drive compressor 104, a reservoir 106, an expansion engine 108, a heat exchanger 110 at the expansion engine, a prime mover 344, and a heat exchanger 346 at the prime mover. The heat exchanger 110 at the expansion engine may include a preheater 238 before the first stage 224 and a reheater 240 before the second stage 226 and any subsequent stages of a multi-stage expansion engine 108. The inter-cooler 352 and the after-cooler 354 may be fin-fan gas-to-air coolers.

Natural gas flows through the system 300 as described above for FIG. 1, except that the energy for the heat exchanger 110 at the expander may come from the heat exchanger 346 at the prime mover as described below.

The prime mover 344 preferably generates electric power and necessarily produces waste heat. Thus, in embodiments the prime mover 344 may be a gas-fired turbine or reciprocating engine and include a generator 356. The prime mover 344 may burn natural gas or another fuel. The burned natural gas may be from the natural gas pipeline system 102 or from another source. The electric power generated by the prime mover 344 could be used to power the compressor 104, or the electric power could be sent to the electric power grid 114 or elsewhere.

The heat exchanger 346 at the prime mover captures waste heat from the prime mover 344, particularly from the prime mover's exhaust, and transfers the heat energy to a thermal transfer fluid. As noted above, the thermal transfer fluid is preferably water. The heat exchanger 346 at the prime mover may include a waste-heat recovery unit 348 and a heater 350. The heater 350 may be a shell-and-tube heat exchanger.

The waste-heat recovery unit 348 is configured to capture the waste heat from the prime mover 344 and may use the waste heat to generate hot fluid, such as steam or hot water, or both. Thus, the waste-heat recovery unit 348 may be a heat-recovery steam generator or a heat-recovery boiler. The steam or hot fluid is then sent to the heater 350, which is a heat exchanger configured to heat the thermal transfer fluid. The heated thermal transfer fluid then passes from the heater 350 to the heat exchanger 110 at the expander. In embodiments having a preheater 238 and a reheater 240, the heated thermal transfer fluid may be sent from the heater 350 of the heat exchanger 346 at the prime mover to the preheater 238 and reheater 240 of the heat exchanger 110 at the expander. In this way, at least a portion of the waste heat from the prime mover 344 is transferred to the heat exchanger 110 at the expander. As this can result in higher temperatures for the gas entering the expansion engine than in the adiabatic case of system 200, greater power production from the expansion engine is possible.

Thus, the system of FIG. 3 may be particularly useful for increased power production or when storing energy for very long periods of time, such that the waste heat of compression as described for the system of FIG. 2 is unavailable, the heat source for the thermal transfer fluid could be the gas-powered prime mover 344.

Figure 4:
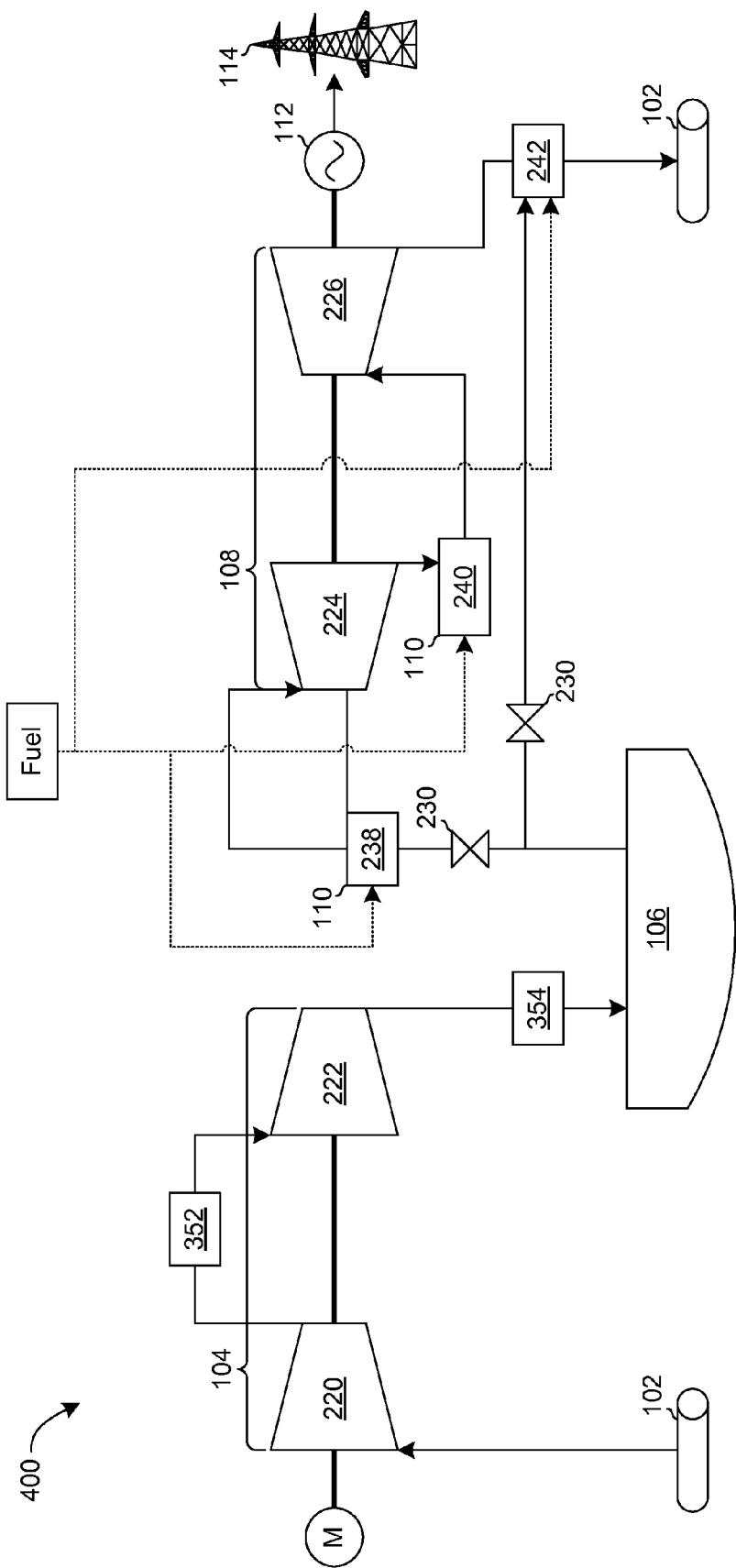
FIG. 4 is a block diagram of a system for CGES having a water bath as a heat source, according to embodiments.

FIG. 4 is a system 400 for compressed gas energy storage having an alternative heat source, such as a water-bath line-heater, according to embodiments. The system may include a natural gas pipeline system 102, a compressor 104, a reservoir 106, an expansion engine 108, and a heat exchanger 110 at the expander. In embodiments having a multi-stage expansion engine 108, the heat exchanger 110 at the expander may include a preheater 238 before the first stage 224 and a reheater 240 before the second stage 226 and any subsequent stages of the expansion engine 108. Some embodiments may include a heat exchanger 218 at the compressor, such as described above for FIG. 2. Natural gas flows through the system as described above for FIG. 1.

In some embodiments, such as shown in FIG. 4, the preheater 238 and the reheater 240 could be liquid-bath heat exchangers. The liquid-bath heat exchangers could be gas fired in that they burn natural gas or another fuel to heat the liquid bath. The burned natural gas may be from the natural gas pipeline system 102 or from another source. In this context, the liquid bath need not include water or only water. For example, in embodiments the liquid bath could include water, a mixture of water and glycol, or heat transfer fluid.

Accordingly, a method of storing, at a natural gas storage facility, electrical power from a power grid 114 and later returning stored electrical power to the power grid 114 may include receiving natural gas from a natural gas pipeline system 102 at a pipeline pressure; receiving electrical power from a power grid 114 to power a compressor 104; utilizing the compressor 104 to compress the natural gas from the pipeline pressure to a reservoir pressure, thereby producing high-pressure natural gas; temporarily storing the high-pressure natural gas in an underground, depleted gas reservoir 106; removing a portion of the high-pressure natural gas from the reservoir 106 and then heating the removed natural gas with a first heat exchanger 110; expanding the heated natural gas from the reservoir pressure to the pipeline pressure, thereby producing a cooler, reduced-pressure natural gas, the expansion occurring through an expansion engine 108; driving, with the expansion engine 108 and concurrent with the expansion, a generator 112 that is co-located at the natural gas storage facility with the reservoir 106, the expansion engine 108, and the first heat exchanger 110; producing electrical power with the generator 112; transmitting the produced electrical power to the power grid 114; and returning the reduced-pressure natural gas to a natural gas pipeline system 102.

In some embodiments, the method may also include capturing the waste heat of compression with a second heat exchanger 218; heating thermal transfer fluid with the waste heat of compression; and storing the heated thermal transfer fluid. In such embodiments, the method may also include temporarily storing the thermal transfer fluid in a hot tank 232 after heating the thermal transfer fluid with the waste heat of compression and before heating the removed natural gas with the first heat exchanger; and temporarily storing the thermal transfer fluid in a cold tank 234 after heating the removed natural gas with the first heat exchanger and before returning the thermal transfer fluid to the second heat exchanger 218.

In some embodiments, the method may also include operating a prime mover 344; capturing waste heat emitted by the prime mover 344; and heating thermal transfer fluid with the prime mover waste heat before heating the removed natural gas with the first heat exchanger 110. In such embodiments, capturing the waste heat emitted by the prime mover 344 may further include generating hot fluid from the waste heat; and heating the thermal transfer fluid may further include using the generated hot fluid to heat the thermal transfer fluid.

Also, in some embodiments, heating the removed natural gas with the first heat exchanger may include heating the removed natural gas with a liquid bath.

In embodiments, the method may also include removing moisture from the natural gas with a dehydration unit 242 before returning the reduced-pressure natural gas to the natural gas pipeline system 102. The dehydration unit may be co-located at the natural gas storage facility with the reservoir 106, the expansion engine 108, the first heat exchanger 110, and the generator 112.

Turning to an example system, power generation calculations using a turbo-expander design in an adiabatic case, such as shown in FIG. 2, may be realized using the following assumptions and conditions.

Assume that natural gas in the reservoir 106 is at 3,160 psia and 100° F., and the natural gas is preheated to 200° F. before entering a two-stage turbo-expander. Further, assume that the first stage 224 of the two-stage turbo-expander has an 85% isentropic efficiency and a pressure ratio of 1.79. Also, assume that the natural gas is reheated to 200° F. before the second stage 226 of the two-stage turbo-expander, which has an 85% isentropic efficiency and a pressure ratio of 1.89. Finally, assume that the natural gas flow rate through the system is 320 million standard cubic feet per day (MMSCFD).

Then, using the same natural gas composition given above:

The shaft power output of the first stage is 5,600 kW
The shaft power output of the second stage is 6,218 kW
Total shaft power output is 11,818 kW
Total electric power generation is 11,155 kW (the combined efficiency of the gearbox and synchronous generator is 94.4%)
Preheater duty is 8,839 Btu/s
Reheater duty is 5,812 Btu/s
Total gas heating duty is 14,651 Btu/s
Still keeping with this example, the following observations are made. At the same compression-expansion rate, the roundtrip efficiency (RTE) of the system is approximately 11,155/26,426=42.2%. At the turbo-expander discharge, the natural gas temperature is about 129° F., which is safe from a hydrate formation or hydrocarbon dewpoint perspective.

If the flow rate of the natural gas increased to 542 MMSCFD, with the same assumptions as presented above, the total electric power generation is 18,899 kW, and the RTE remains at 42.2%.

Accordingly, embodiments may provide systems and methods for taking power from the electric power grid to compress natural gas for temporary storage. After temporary storage, the compressed natural gas may be expanded through an expansion engine to drive a generator that converts the energy from the expanding natural gas into electrical power, which may then be returned to the electric power grid. In this way, the disclosed systems and methods may provide ways to temporarily store, and then restore, power from and to the electric power grid. Some of these methods and systems may be adiabatic as discussed.

Thus, the disclosed systems and methods may facilitate integration of renewable energy sources into the power grid. While such energy sources typically have intermittency issues, the systems and methods disclosed in this application may help by returning stored renewable energy to the power grid when the renewable energy sources are not supplying enough power to meet the demand of the power grid.

Preferably, the components of the system for compressed gas energy storage are co-located at the same natural gas storage facility. In this context, storage facility means a facility where the natural gas is compressed to reservoir pressure for storage off of a pipeline of a natural gas pipeline system, subsequently expanded back to pipeline pressure, and reintroduced into the pipeline or another pipeline. This allows natural gas storage; electrical energy storage, in the form of high-pressure natural gas; and electrical energy generation, from the expanding natural gas driving a generator, to take place at the same facility under the methods and systems described in this application.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Moreover, although specific embodiments of the invention have been illustrated and described for purposes of illustration, it will be understood that various modifications may be made without departing from the spirit and scope of the invention. Accordingly, the invention should not be limited except as by the appended claims.

The invention claimed is:

1. A system at a natural gas storage facility, the system comprising:
   natural gas received from a natural gas pipeline system;
   a compressor configured to receive the natural gas and to compress the natural gas from a pipeline pressure to a reservoir pressure to form high-pressure natural gas and waste heat of compression;
   a controllable reservoir configured to receive the high-pressure natural gas from the compressor, temporarily store the high-pressure natural gas, and release the high-pressure natural gas after storage;
   an expansion engine configured to receive the high-pressure natural gas from the reservoir, expand the high-pressure natural gas from the reservoir pressure to the pipeline pressure, and produce useful power;
   a heat exchanger at the expansion engine configured to heat the high-pressure natural gas from the reservoir prior to expansion;
   a heat exchanger at the compressor configured to heat a thermal transfer fluid from the waste heat of compression;
   a thermal storage system configured to temporarily store thermal energy, the thermal storage system including:
      a hot tank configured to receive the thermal transfer fluid from the heat exchanger at the compressor and to temporarily store the thermal transfer fluid, in which the heat exchanger at the expansion engine is further configured to receive the thermal transfer fluid from the hot tank; and
      a cold tank configured to receive the thermal transfer fluid from the heat exchanger at the expansion engine and to temporarily store the thermal transfer fluid, in which the heat exchanger at the compressor is further configured to receive the thermal transfer fluid from the cold tank;

an electric generator co-located at the natural gas storage facility with the compressor, the reservoir, the expansion engine, and the heat exchanger at the expansion engine, the generator configured to be driven by the useful power produced by the expansion engine; and a system outlet configured to receive the natural gas from the expansion engine and to return the natural gas to the natural gas pipeline system.

2. The system of claim 1, in which the compressor is an electric drive compressor.

3. The system of claim 1, in which the reservoir is a depleted gas reservoir.

4. The system of claim 1, further comprising a gearbox between the expansion engine and the generator, in which the gearbox is configured to change a rotational speed of the expansion engine to a required rotational speed of the generator.

5. The system of claim 1, in which the compressor is a multi-stage compressor and the expansion engine is a multi-stage expansion engine.

6. The system of claim 1, in which the thermal storage system further includes a cooling heat exchanger between the cold tank and the heat exchanger at the compressor, the cooling heat exchanger being configured to cool the thermal storage medium from a cold tank temperature.

7. A system at a natural gas storage facility, the system comprising:

natural gas received from a natural gas pipeline system;

a compressor configured to receive the natural gas and to compress the natural gas from a pipeline pressure to a reservoir pressure to form high-pressure natural gas and waste heat of compression;

a controllable reservoir configured to receive the high-pressure natural gas from the compressor, temporarily store the high-pressure natural gas, and release the high-pressure natural gas after storage;

a multi-stage expansion engine configured to receive the high-pressure natural gas from the reservoir, expand the high-pressure natural gas from the reservoir pressure to the pipeline pressure, and produce useful power;

a heat exchanger at the expansion engine configured to heat the high-pressure natural gas from the reservoir prior to expansion;

a prime mover configured to generate electric power;

a heat exchanger at the prime mover configured to capture waste heat energy from the prime mover and to transfer the heat energy to a thermal transfer fluid, in which the heat exchanger at the expansion engine is further configured to receive the thermal transfer fluid from the heat exchanger at the prime mover to heat the high-pressure natural gas from the reservoir prior to each stage of expansion; and an electric generator co-located at the natural gas storage facility with the compressor, the reservoir, the expansion engine, and the heat exchanger at the expansion engine, the generator configured to be driven by the useful power produced by the expansion engine; and a system outlet configured to receive the natural gas from the expansion engine and to return the natural gas to the natural gas pipeline system.

8. The system of claim 7, in which the heat exchanger at the expansion engine includes a preheater before a first stage of the expansion engine and a reheater before each subsequent stage of the expansion engine.

9. The system of claim 7, in which the heat exchanger at the prime mover includes:

a waste heat recovery unit configured to capture the waste heat energy from the prime mover and to use the waste heat energy to generate hot fluid; and a heater configured to receive the generated hot fluid from the waste heat recovery unit and to heat the thermal transfer fluid.

10. The system of claim 7, in which the heat exchanger at the expansion engine includes a liquid-bath heat exchanger.

11. The system of claim 7, in which the system outlet further comprises a dehydration unit configured remove moisture from the natural gas.

12. The system of claim 7, in which the compressor is an electric drive compressor.

13. The system of claim 7, in which the reservoir is a depleted gas reservoir.

* * * * *